UNITED STATES PATENT OFFICE 2,482,825

PUTTY COMPRISING A LIQUID MONOMER AND A FINELY DIVIDED SOLID INSOLUBLE POLYMER

James L. Amos and Earl D. Morris, Midland, Mich., assignors to The Dow Chemical Company, Midland, Mich., a corporation of Delaware No Drawing. Application July 5, 1946, Serial No. 681,590

1 Claim. (Cl. 260—45.5)

This invention concerns certain new cements, or putties, and a method of making the same. It pertains especially to putties composed principally of hydrocarbons and having good dielectric properties rendering them suitable for use as filling or sealing materials in electrical devices.

The cements, or putties, of the invention comprise a readily polymerizable unsaturated organic compound as a liquid vehicle and a finely-divided, substantially insoluble polymer or copolymer of a polyvinyl aromatic compound as a filler and thickening agent. Examples of liquid, polymerizable, unsaturated organic compounds which may be used as the vehicle are styrene, ortho-chlorostyrene, meta-chlorostyrene, para-chlorostyrene, dichlorostyrene, ortho-methyl-styrene, meta-methylstyrene, para-methylstyrene, ortho-ethylstyrene, meta-ethylstyrene, para-ethylstyrene, methyl-methacrylate, vinyl acetate, and drying oils such as linseed oil, tung oil, oiticia oil, or dehydrated castor oil, and mixtures of two or more of such polymerizable compounds, etc. Mixtures of any such polymerizable compounds with 20 per cent by weight or less, preferably from 3 to 10 per cent, of a polyvinyl aromatic compound such as divinylbenzene, may be used as a liquid vehicle to form a putty which, after setting, is insoluble in most organic solvents. Polymerizable hydrocarbons, particularly styrene and the nuclear alkylated styrenes just mentioned, are preferred since they may rapidly be polymerized to cause the putty to set, or harden, and they possess excellent electric insulating properties both before and after being polymerized.

All of the alkylated styrenes herein referred to contain the alkyl radicals attached to carbon atoms of the aromatic nucleus.

Examples of polymers and copolymers of polyvinyl aromatic compounds which may be used as fillers and thickening agents in preparing the putties are the solid, benzene-insoluble polymers of divinylbenzene, ethyl-divinylbenzene, or trivinylbenzene, etc., and solid benzene-insoluble copolymers of 0.5 per cent by weight or more of any such polyvinyl aromatic compound with a monovinyl, or a monovinylidene, compound, e. g. styrene, a nuclear chlorinated styrene, a nuclear alkylated styrene, or methylmethacrylate, etc. Such copolymers of styrene and divinylbenzene and of styrene, ethylstyrene and divinylbenzene are readily available and are preferred. The polymers and copolymers of polyvinyl aromatic compounds, just mentioned, have a property of being readily ground, or crushed, to a fine powder suitable for use in making the putty. They are usually employed in the form of a powder capable of passing a 100 mesh screen, but may be used in the form of somewhat larger particles if desired.

A putty is formed by admixing the aforementioned polymerizable liquid vehicle and finely-divided, insoluble polymer or copolymer of a polyvinyl aromatic compound in relative proportions such as to form a paste, or putty, of a desired thickness or body. Usually the insoluble polymeric material is employed in amount such as to form a mass which will flow gradually, particularly under a moderate pressure such as that of the hand, and which will not bleed or exude to any great extent the liquid vehicle. The proportion of insoluble polymeric material required to form such putty varies somewhat with changes in the kind or particle size thereof, or the kind of vehicle employed, but in most instances the insoluble copolymer is employed in amount corresponding to between 30 and 60 per cent of the combined weight of the same and the vehicle.

Usually a small amount, e. g. from 0.1 to 5 per cent by weight, of a polymerization catalyst such as benzoyl peroxide, lauroyl peroxide, or peracetic acid, etc., is incorporated in the putty for purpose of catalyzing polymerization of the liquid vehicle and thereby shortening the setting time of the putty, but such catalyst is not required. In some instances, a polymerization inhibitor is added to the putty in amount such that the inhibitor is effective in preventing polymerization of the liquid vehicle at room temperature, but not at elevated temperatures, e. g. 70° C. or above. Only a very small proportion, e. g. from 0.0005 to 0.1 per cent by weight, of an effective polymerization inhibitor such as catechol, tertiary-butyl-catechol, or 2,4-dichloro-nitrophenol, etc. is usually required to accomplish such result. It is also possible to incorporate in the putty such minor amounts of both a polymerization inhibitor and a polymerization catalyst so as to stabilize the liquid vehicle against polymerization at room temperature, but permit rapid polymerization and resultant setting of the putty at elevated temperatures. Other ingredients such as dyes, pigments, anti-oxidants, plasticizers, or fillers such as clay, silica, or powdered glass, etc., may also be added, but are not required.

The putties prepared as just described are soft plastic materials which are readily applied in filling cracks, cavities, or other openings, e. g. in electrical devices. They set quite rapidly, particularly when warmed to hard resinous materials. They undergo shrinkage to only a slight, and usually inconsequential, extent during setting. In most instances they form a bond with the surfaces, e. g. of wood, metal, glass, or paper, etc., to which they are applied. Because of their good electric insulating properties, they are particularly suitable for use in electrical devices such as batteries, transformers, condensers, terminal boxes, etc. They are, of course, also adapted to other and more general uses such as stoppage of water leaks, etc.

The following examples describe certain ways in which the principle of the invention has been applied, but are not to be construed as limiting the invention.

Example 1

A solid, benzene-insoluble copolymer of 88 per cent by weight styrene, 7 per cent of ar-ethylstyrene (i. e. monoethyl-vinylbenzene) and 5 per cent divinylbenzene was ground to a powder of from 100 to 150 mesh size. One part by weight of the powder was admixed with 2 parts of styrene to form a plastic putty-like mass which did not bleed or exude to any great extent the styrene content thereof. The putty was caused to set and harden by warming the same at 50° C. for 7 days, at 100° C. for 2 days, and at 150° C. for 2 days. The resultant solid thermoplastic material was molded to form test pieces having dimensions of 0.1 inch by 0.5 inch by 1.75 inches. The tensile strength in pounds per square inch cross section; the impact strength in inch-pounds of energy applied by a blow to cause breakage; the heat distortion temperature in degrees centigrade; and the electric power factor at a current frequency of $10^6$ cycles per second of molded test pieces were determined in the usual ways. It may be mentioned that, except for the size of test piece, the methods used in determining the tensile strength, impact strength, and heat distortion temperature are similar to those described in A. S. T. M. D412-39T, A. S. T. M. D256-34T, and A. S. T. M. D48-33T, respectively. The test pieces were found to have a tensile strength of 6260 pounds per square inch cross section, an impact strength of 1.1 inch-pounds, a heat distortion temperature of 79° C., and a per cent electric power factor of 0.049.

Example 2

A putty capable of being troweled into place was prepared by intimately admixing 36 parts by weight of styrene, 24 parts of Paraplex X100 (an unsaturated alkyd resin consisting essentially of an ester resulting from a condensation reaction between propylene glycol, sebacic acid and maleic acid), 1 part of lauroyl peroxide, and 40 parts of a finely-divided, benzene-insoluble copolymer of 75 per cent by weight styrene, 17.5 per cent ar-ethylstyrene (i. e. ethylvinylbenzene) and 7.5 per cent divinylbenzene. The copolymer was employed in the form of particles capable of passing through a 24 mesh screen. The putty was set to a solid mass by warming the same at 50° C. for about 10 minutes.

Other modes of applying the principle of the invention may be employed instead of those explained, change being made as regards the method or compositions herein disclosed, provided the steps or ingredients stated by any of the following claims or the equivalent of such stated steps or ingredients be employed.

We therefore particularly point out and distinctly claim as our invention:

A putty comprising a polymerizable liquid vinyl aromatic hydrocarbon having the vinyl radical attached to a carbon atom of the aromatic nucleus, a minor amount of a polymerization catalyst and a finely divided solid benzene-insoluble copolymer of styrene, ar-ethyl-vinyl-benzene and divinylbenzene in amount sufficient to form a plastic paste.

JAMES L. AMOS.
EARL D. MORRIS.

REFERENCES CITED

The following references are of record in the file of this patent:

UNITED STATES PATENTS

| Number | Name | Date |
|---|---|---|
| 2,254,072 | Jenkins | Aug. 26, 1941 |
| 2,269,810 | Dreisbach et al. | Jan. 13, 1942 |

FOREIGN PATENTS

| Number | Country | Date |
|---|---|---|
| 345,197 | Great Britain | Mar. 9, 1931 |

OTHER REFERENCES

Ser. No. 216,606, Muller et al. (A. P. C.), pub. April 20, 1943.